(12) United States Patent
Combe

(10) Patent No.: US 8,287,014 B2
(45) Date of Patent: Oct. 16, 2012

(54) UTILITY LOCATION SHOVEL

(76) Inventor: Daniel Combe, Clinton, UT (US)

( * ) Notice: Subject to any disclaimer, the term of this patent is extended or adjusted under 35 U.S.C. 154(b) by 0 days.

(21) Appl. No.: 12/944,573

(22) Filed: Nov. 11, 2010

(65) Prior Publication Data

US 2011/0140467 A1   Jun. 16, 2011

Related U.S. Application Data

(60) Provisional application No. 61/285,419, filed on Dec. 10, 2009.

(51) Int. Cl.
*A01B 1/00* (2006.01)

(52) U.S. Cl. .............. 294/49; 76/113; 172/371

(58) Field of Classification Search .......... 294/49, 294/181; 172/371, 381; 76/113
See application file for complete search history.

(56) References Cited

U.S. PATENT DOCUMENTS

| | | | |
|---|---|---|---|
| 467,971 A * | 2/1892 | Hammer | .................... 294/49 |
| 5,520,429 A | 5/1996 | Gregory | |
| 5,533,768 A | 7/1996 | Mitchell | |
| 5,664,820 A | 9/1997 | Carmien | |
| 5,669,649 A | 9/1997 | Metcalf | |
| 5,743,580 A | 4/1998 | Evans | |
| D405,329 S | 2/1999 | Argumosa | |
| 6,170,893 B1 * | 1/2001 | Parker | .................... 294/49 |
| 6,338,511 B1 | 1/2002 | Douglas et al. | |
| D482,249 S | 11/2003 | Atnip et al. | |
| 6,837,528 B1 * | 1/2005 | Britt | .................... 294/49 |
| 7,350,839 B2 | 4/2008 | Marquardt et al. | |
| 7,571,945 B2 | 8/2009 | Walker et al. | |
| 2005/0189774 A1 | 9/2005 | Conaway et al. | |
| 2007/0145756 A1 | 6/2007 | DeWinter | |
| 2008/0309105 A1 * | 12/2008 | Hayner | .................... 294/49 |
| 2009/0021032 A1 | 1/2009 | Rathmell et al. | |

FOREIGN PATENT DOCUMENTS

CN   201135067   10/2008

* cited by examiner

*Primary Examiner* — Saul Rodriguez
*Assistant Examiner* — Gabriela Puig
(74) *Attorney, Agent, or Firm* — Kunzler Law Group, PC

(57) ABSTRACT

According to one embodiment, a shovel for excavating material within a utility location includes a blade made from a non-metal material. The blade has an overall thickness and a leading edge with a blunt surface and a beveled surface. The overall thickness of the blade includes a combined thickness of the blunt and beveled surfaces. The thickness of the blunt surface is between about 25% and about 75% of the overall thickness of the blade. The shovel also includes a neck coupled to the blade, as well as a handle coupled to the neck.

19 Claims, 3 Drawing Sheets

UTILITY LOCATION SHOVEL

CROSS-REFERENCE TO RELATED APPLICATION

This application claims the benefit of U.S. Provisional Patent Application No. 61/285,419, filed Dec. 10, 2009, which is incorporated herein by reference.

FIELD

The present disclosure relates to shovels, and more particularly to digging shovels for digging within and near utility locations.

BACKGROUND

Digging or garden shovels for manually excavating earth are widely known in the art. Generally, digging shovels for excavating earth are configured differently than scooping shovels for scooping loose materials (e.g., snow and grain shovels). For example, digging shovels often have a rounded, pointed, or otherwise non-straight leading edge in plan view (e.g., angled with respect to digging motion) and scooping shovels have a substantially straight leading edge in plan view (e.g., perpendicular with respect to scooping motion). Typically, digging shovels include a broad blade (e.g., head) attached to a handle. The blade usually includes a leading edge designed to penetrate the earth (e.g., soil, dirt, clay, gravel, sand, etc.) and a curved portion designed to retain earth thereon. For ease in penetrating the earth and cutting through particularly dense objects often embedded in the earth (e.g., roots, rocks, clods, etc.), the leading edge of most digging shovels is relatively sharp and the profile of most digging shovels is shallow or thin. Conventional shovels may be useful for cutting dense objects intended to be cut. However, conventional shovels can be prone to cutting dense objects not intended to be cut.

To comply with common utility safety regulations, blue stake markers (or similar indicators) are embedded in the ground by utility companies to indicate the presence of utility lines, such as gas lines, cable lines, water lines, and the like. As used herein, such utility lines are categorized as dense objects. Generally, utility safety regulations restrict the use of automated equipment within a certain area or zone about the markers to prevent inadvertent puncturing of the utility lines. In certain locations, the safety zone is defined as a circle with a regulated radius (e.g., two feet) that is concentric with the markers. Because use of automated equipment is restricted, only hand tools, such as conventional digging shovels, are allowed to excavate earth within the restricted area around the markers. Although conventional digging shovels may be safer than automated equipment, due to their relatively sharp leading edges and shallow profile, conventional shovels still are susceptible to inadvertently puncturing utility lines or dense objects even when operators of the shovels are careful.

Additionally, the blade of most conventional digging shovels is made from a metal or metal alloy, such as steel. Some metal blades may be desirable in certain applications due to their strength, cutting ability, speed, and durability. However, the use of metal blades may be disadvantageous in other applications. For example, metals and metal alloys are particularly porous materials. Accordingly, metal blades are not self-lubricating (e.g., non-sticking). As a result, excavated earth tends to stick to metal blades. Also, metal blades are susceptible to sparking when the blades come into contact with certain objects, such as rocks or pipes. Sparks occurring within the restricted area around utility markers are particularly dangerous when one or more of the utility lines passing through the restricted area contains a flammable substance, such as natural gas or propane.

SUMMARY

The subject matter of the present application has been developed in response to the present state of the art, and in particular, in response to the problems and needs in the art that have not yet been fully solved by currently available digging shovels. Accordingly, the subject matter of the present application has been developed to provide various embodiments of a utility location shovel that overcomes one or more of the above shortcomings of conventional digging shovels. Generally, in certain embodiments, the utility location shovel can be used in various applications, but is specifically designed to safely excavate earth within restricted areas marked by utility markers. The utility location shovel can have a relatively blunt leading edge, beveled trailing edge, and deep profile to promote digging within a restricted area while simultaneously substantially reducing the likelihood of puncturing a utility line. Accordingly, the edge configuration of the shovel promotes efficient and safe digging environments. Additionally, the utility location shovel can be made from a self-lubricating and spark-resistant hardened plastic.

According to one embodiment, a shovel for excavating material within a utility location includes a blade made from a non-metal material. The blade has an overall thickness and a leading edge with a blunt surface and a beveled surface. The overall thickness of the blade includes a combined thickness of the blunt and beveled surfaces. The thickness of the blunt surface is between about 25% and about 75% of the overall thickness of the blade. The shovel also includes a neck coupled to the blade, as well as a handle coupled to the neck.

In certain implementations, the thickness of the blunt surface is about 50% of the overall thickness of the blade. A ratio of the overall thickness of the blade to the width of the blade can be between about 0.010 and about 0.050. In some implementations, the ratio of the overall thickness of the blade to the width of the blade is about 0.028. A ratio of the overall thickness of the blade to the length of the blade can be between about 0.010 and about 0.050. In some implementations, the ratio of the overall thickness of the blade to the length of the blade is about 0.025.

According to some implementations, the beveled surface forms an angle of between about 10° and about 50° relative to the blunt surface. In one implementation, the beveled surface forms an angle of about 30° relative to the blunt surface. In yet some implementations, the blade comprises a convex bottom surface and an opposing concave top surface, and the beveled surface forms an angle of between about 40° and about 80° relative to the bottom surface. In one implementation, the beveled surface forms an angle of about 60° relative to the bottom surface.

In certain implementations, the neck is removably coupled to the blade, and the handle is removably coupled to the neck. In other implementations, the neck forms a one-piece monolithic construction with the blade. The leading edge of the blade can be configured to prevent puncturing of utility lines located within the utility location. In some implementations, the overall thickness of the blade is about 0.250 inches. The non-metal material comprises a high-strength polymer, such as Delrin® 150.

According to some implementations, the blade includes opposing side edges, a convex bottom surface that extends between the side edges, and a concave top surface opposing the bottom surface that extends between the side edges. The leading edge can define a generally non-pointed, curved edge extending from one side edge to the other side edge. The blunt surface can be substantially flat and extend perpendicularly away from the top surface.

In another embodiment, a non-metal shovel blade includes first and second opposing side edges. The blade also includes a convex bottom surface that extends between the first and second opposing side edges, and a concave top surface that extends between the first and second opposing side edges. Further, the blade includes a leading edge that extends lengthwise along an arcuate path between the first and second opposing side edges. The leading edge also extends widthwise between the bottom and top surfaces. The leading edge includes a flat blunt surface that extends perpendicularly relative to the top surface and a flat beveled surface that extends from the flat blunt surface to the bottom surface at an angle between about 40° and about 80° relative to the top surface. A thickness of the flat blunt surface can be about 50% of a total thickness of the blade and a thickness of the flat beveled surface can be about 50% of the total thickness of the blade.

According to yet another embodiment, a non-metal shovel blade includes a blunt surface portion of a leading edge, and a beveled surface portion of the leading edge. An overall thickness of the blade includes a combined thickness of the blunt and beveled surface portions. The thickness of the blunt surface is between about 25% and about 75% of the overall thickness of the blade.

Reference throughout this specification to features, advantages, or similar language does not imply that all of the features and advantages that may be realized with the present disclosure should be or are in any single embodiment or implementation of the invention. Rather, language referring to the features and advantages is understood to mean that a specific feature, advantage, or characteristic described in connection with an embodiment is included in at least one embodiment of the present disclosure. Discussion of the features and advantages, and similar language, throughout this specification may, but do not necessarily, refer to the same embodiment or implementation.

The described features, advantages, and characteristics of the subject matter of the present disclosure may be combined in any suitable manner in one or more embodiments and/or implementations. One skilled in the relevant art will recognize that the subject matter of the present disclosure may be practiced without one or more of the specific features or advantages of a particular embodiment or implementation. In other instances, additional features and advantages may be recognized in certain embodiments and/or implementations that may not be present in all embodiments or implementations. These features and advantages of the present disclosure will become more fully apparent from the following description and appended claims, or may be learned by the practice of the disclosure's subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the present invention. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present invention, however, absent an express correlation to indicate otherwise, an implementation may be associated with one or more embodiments.

Figure 1:
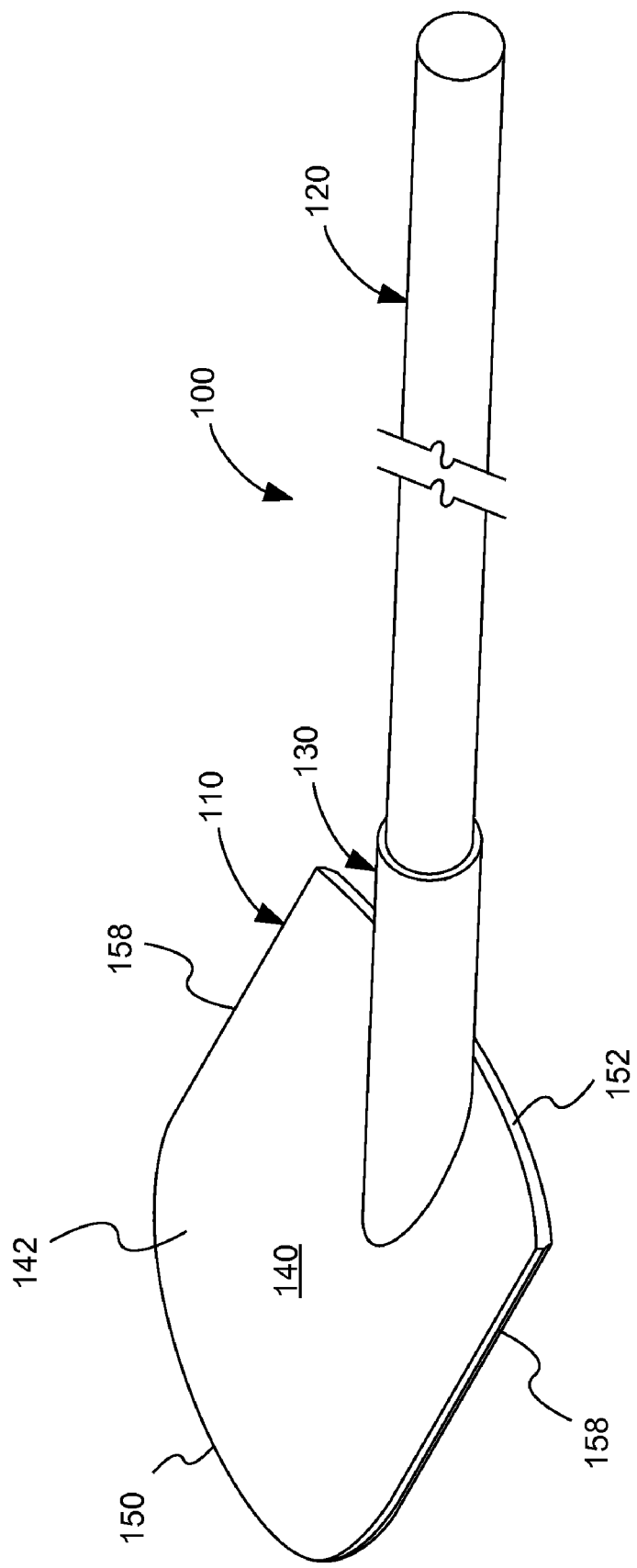
FIG. 1 is a perspective view of a shovel according to one representative embodiment.

In the following description, numerous specific details are provided to impart a thorough understanding of embodiments of the invention. One skilled in the relevant art will recognize, however, that the subject matter of the present disclosure may be practiced without one or more of the specific details, or with other methods, components, materials, and so forth. In other instances, well-known structures, materials, or operations are not shown or described in detail to avoid obscuring aspects of the disclosure. Tinge Referring to FIG. 1, one embodiment of a utility location shovel 100 includes a blade or head 110 coupled to a handle 120 via a neck 130. The shovel 100 can be used to excavate earth in any of various locations and for any of various applications. However, the shovel 100 is particularly suitable for excavating earth in a utility location. The utility location can be a restricted area within which the use of automated equipment is restricted, such as a marked or unmarked utility or safety zone. Excavating is defined herein as moving and/or removing earth. Generally, excavating includes digging applications, as opposed to scooping applications. Although, in certain instances, excavating may include scooping applications.

Figure 2:
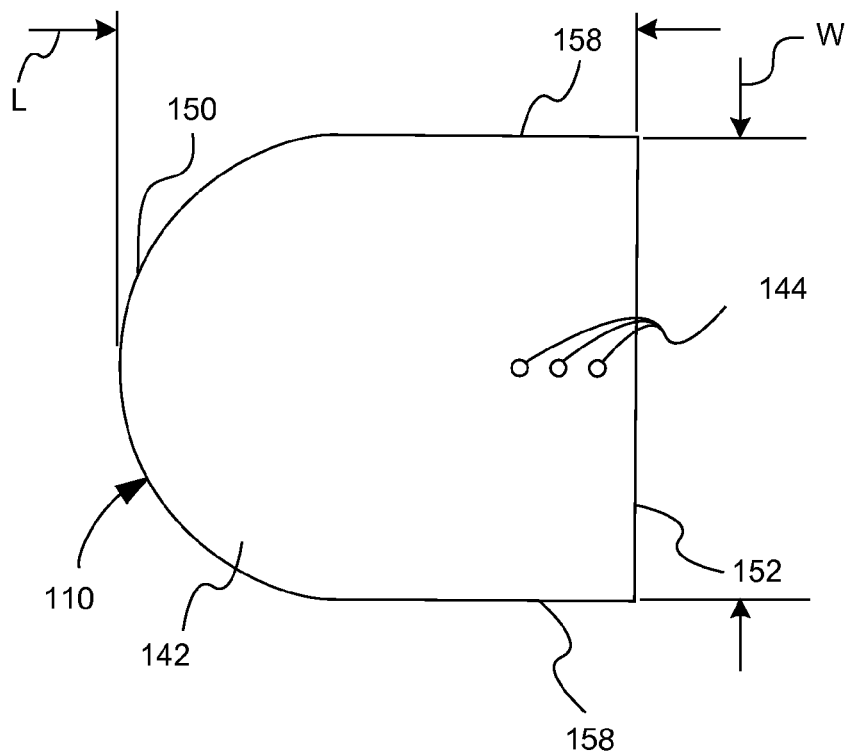
FIG. 2 is a top plan view of a blade of the shovel of FIG. 1 according to one embodiment.

The blade 110 includes a leading edge 150, a trailing edge 152, side edges 158, and a material containment space 140. The leading edge 150, trailing edge 152, and side edges 158 define the outer periphery of the blade 110. In plan view (see FIG. 2), the blade 110 has a generally spade-like shape. More specifically, the side edges 158 extend substantially perpendicularly away from the trailing edge 152, and respective opposing portions of the leading edge 150 extend away from an associated side edge 158 and toward an opposing side edge at an angle with respect to the trailing edge 152. As shown, the leading edge 150 is substantially curved and forms a generally arcuate shape. Accordingly, the respective opposing portions of the leading edge 150 extend away from the associated side edge 158, follow a curved path, and converge at a midway point between the side edges. In the illustrated implementation, as viewed from above, the leading edge 150 has a generally semi-circular shape. However, in other implementations, as viewed from above, the leading edge 150 has an oblong, semi-elliptical, or semi-ovular shape. Preferably, the leading edge 150 is substantially non-pointed as viewed from above.

Figure 3:
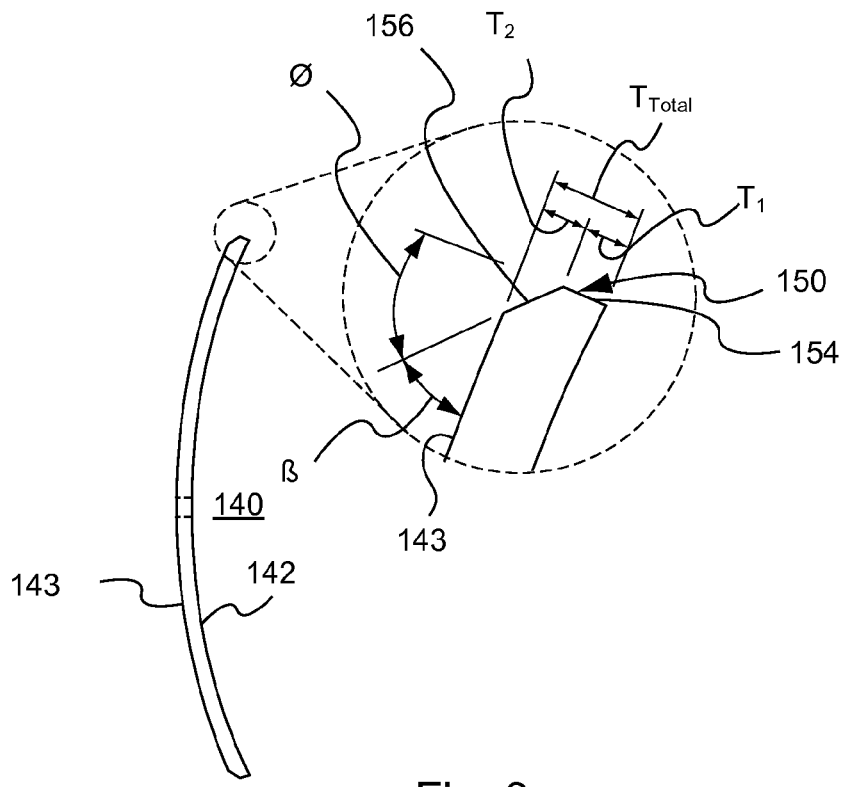
FIG. 3 is a profile view of the blade of FIG. 2 according to one embodiment.

Referring to FIG. 3, the profile of the blade 110 has a substantially curved or arcuate shape. In certain implementations, the profile of the blade 110 can be described as having a generally U-shaped or C-shaped. The blade 110 includes a top surface 142 and a bottom surface 143 opposing the top surface. The top surface 142 is generally concave and the bottom surface 143 is correspondingly generally convex. The material containment space 140 is defined between the edges 150, 152, 158 of the shovel 100 and the top surface 142. The concavity of the top surface 142 facilitates the retention of materials on the top surface and within the material containment space 140. The blade 110 includes apertures 144 spaced-apart along the middle of the blade. The apertures 144 extend through the blade 110 from the top surface 142 to the bottom surface 143.

The leading edge 150 of the blade 110 is specifically configured to facilitate penetration of the blade into digging material, but prevent puncturing of dense objects, especially utility lines. As shown in FIG. 3, the leading edge 150 includes a blunt surface 154 and a beveled surface 156. Generally, the blunt surface 154 is configured to resist penetration of the blade 110 through solid objects (e.g., utility lines) and the beveled surface 156 is configured to promote penetration of the blade through earth. The blunt surface 154 is a flat surface that extends substantially perpendicularly from the top surface 142 adjacent the leading edge 150. The beveled surface 156 is a flat surface that extends at an angle $\theta$ with respect to the blunt surface 154 and at an acute angle $\beta$ with respect to the bottom surface 143 adjacent the leading edge 150. According to some implementations, the angle $\theta$ is between about 10° and about 50° and the angle $\beta$ is between about 40° and about 80°. In one specific implementation, the angle $\theta$ is about 30° and the angle $\beta$ is about 60°.

The blade 110 has an overall thickness $T_{TOTAL}$ defined as the distance between the top and bottom surfaces 142, 143 at locations adjacent the leading edge 150. The blunt surface 154 has a thickness $T_1$ and the beveled surface 156 has a thickness $T_2$. Accordingly, the overall thickness $T_{TOTAL}$ of the blade 110 can be further defined as the combined thicknesses $T_1$, $T_2$ of the blunt and beveled surfaces 154, 156. In some implementations, the thickness $T_1$ of the blunt surface 154 is between about 25% and about 75% of the overall thickness $T_{TOTAL}$. In one specific implementation, the thickness $T_1$ of the blunt surface 154 is about 50% of the overall thickness $T_{TOTAL}$. According to one exemplary implementation, the overall thickness $T_{TOTAL}$ is about 0.250 inches, the thickness $T_1$ of the blunt surface 154 is about 0.125 inches, and the thickness $T_2$ of the beveled surface 156 is about 0.125 inches. As used herein, a thickness of a feature can also be considered a width of the feature. In other words, the term "thickness" can denote a width and the term "width" can denote a thickness.

Referring back to FIG. 2, the blade 110 has a maximum width W and a maximum length L. In one specific implementation, the maximum width W is about nine inches and the maximum length L is about ten inches. In contrast to blades of conventional digging shovels, the blade 110 is configured such that its overall thickness $T_{TOTAL}$ is relatively high compared to its maximum width W and maximum length L. In some implementations, a ratio of the overall thickness $T_{TOTAL}$ to width W is between about 0.010 and about 0.050, and a ratio of the overall thickness $T_{TOTAL}$ to length L is between about 0.010 and about 0.050. In certain exemplary implementations, the ratio of the overall thickness $T_{TOTAL}$ to width W is about 0.028, and the ratio of the overall thickness $T_{TOTAL}$ to length L is about 0.025.

The configuration of the blade 110, including the relatively blunt leading edge 150, allows a user to manually dig earth within or near a utility location without fear of damaging (e.g., severing) utility lines. Accordingly, users need not use tentative, restrictive, and inefficient digging methods when digging within or near utility locations as is the case with conventional shovels. In this manner, the blade 110 facilitates quicker, easier, and safer digging of earth within or near utility locations compared to conventional shovel blades.

The blade 110 can be made from any of various polymeric or composite materials. Preferably, the blade 110 is made from a high-strength, high-density, and/or impact-resistant polymeric material. By way of example only, in one specific implementation, the polymeric material is Delrin® 150. Compared to conventional shovels with blades made from metals, the polymeric or composite blade 110 is stronger, more impact-resistant, lighter, and less prone to sparking. In certain implementations, the blade 110 is made from a non-sparking, rust-resistant, and self-lubricating (e.g., low porosity) material. In some implementations, the material is harder and stronger than high-density polyethylene.

Figure 4:
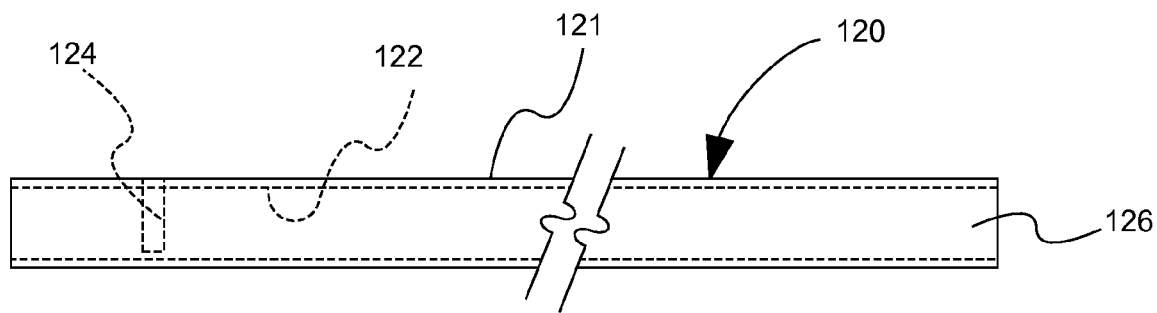
FIG. 4 is a side view of a handle of the shovel of FIG. 1 according to one embodiment.
Figure 5:
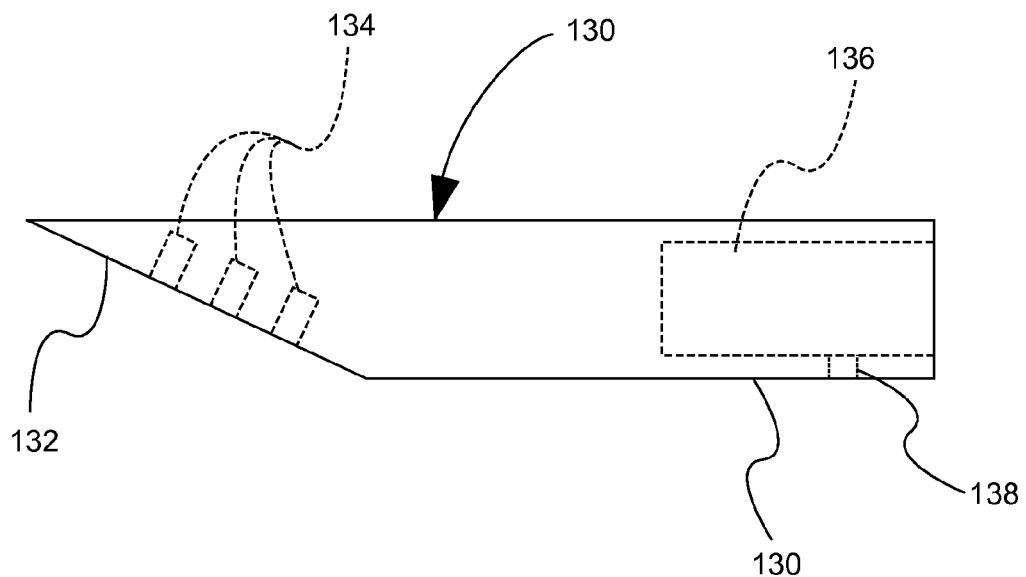
FIG. 5 is a side view of a neck of the shovel of FIG. 1 according to one embodiment.

Referring to FIG. 4, the handle 120 includes a substantially rigid tube-like element 121 that defines an interior channel 122. In some implementations, the tube-like element 121 is made from a strong and lightweight material, such as a high-strength polymer or composite material (e.g., fiberglass). Although, the tube-like element 121 is hollow, in other implementations, the handle can be substantially solid without a hollow interior. In the illustrated embodiment, the channel 122 is sized to receive a solid insert 126 made from a substantially rigid material, such as wood. The insert 126 is configured to increase the rigidity of the handle 120. The handle 120 also includes an aperture 124 extending through the tube-like element and into the insert 126. The aperture 124 may include internal threads configured to receive the external threads of a fastener.

The handle 120 is removably coupled to the blade 110 by the neck 130. The neck 130 includes a generally solid length of material. In some implementations, the neck 130 has a substantially circular cross-sectional shape. One end of the neck 130 includes an angled surface 132 configured to engage and be secured to the top surface 142 (or bottom surface 143 if desired) of the blade 110. The neck 130 includes apertures 134 formed in the angled surface 132. The apertures 134 correspond and are alignable with the apertures 144 formed in the blade. The neck 130 is removably coupled with the blade 110 by aligning the apertures 134, 144, extending a fastener (not shown) through the aligned apertures, and threadably engaging the fastener with the threads formed in the apertures 134 of the neck. Although a threaded fastener approach for coupling the neck 130 and blade 110 is shown and described, other fastening techniques can be used that facilitate removable or non-removable coupling of the neck and blade. For example, in certain implementations, the neck 130 can be joined to the blade 110 using adhesion or welding techniques.

The end of the neck 130 opposite the angled surface 132 includes a handle port 136 (e.g., bored hole) sized to receive the handle 120. Additionally, the neck 130 includes an aperture 138 extending from an outer surface of the neck into the handle port 136. The aperture 138 is alignable with the aperture 124 of the handle 120 when the handle is inserted into the handle port 136. The handle 120 can be removably secured to the neck 130 by extending a fastener (not shown) through the apertures 124, 138 and threadably engaging the fastener with the internal threads of the aperture 124. Accordingly, the neck 130 can be removably secured to the blade 110, and the handle 120 can be removably secured to the neck. In this manner, either of the blade 110, handle 120, or neck 130 can be easily replaced if worn or damaged without requiring replacement of the entire shovel 100 as with some conventional shovels.

Although the handle 120 and neck 130 are shown having substantially circular cross-sectional shapes, in other implementations, the handle and neck can be have any of various cross-sectional shapes, such as square, rectangular, triangular, ovular, and the like. Moreover, the components of the shovel 100 can be formed using any of various techniques known in the art. In certain implementations, however, the components of the shovel 100 are formed using a material extruding or stamping process, as opposed to an injection molding process. But, in other implementations, the components of the shovel are formed using an injection molding process. For example, in one implementation, the blade 110 and the neck 130 are integrated together (e.g., non-removable relative to each other) using an injection molding process such that the blade and neck form a monolithic one-piece construction. In such an implementation, the shovel 100 does not require or include the apertures 144 in the blade 110, the apertures 134 in the neck 130, and fasteners extending through the apertures 144 and into the apertures 134.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A shovel for excavating material within a utility location, comprising:
    a blade made from a non-metal material, the blade comprising an overall thickness defined between a concave top surface and a convex bottom surface, the concave top and convex bottom surfaces extending between opposing side edges, wherein the blade comprises a width defined between the opposing side edges, the width being substantially larger than the overall thickness, the blade further comprising a leading edge having a blunt surface and a beveled surface, wherein the overall thickness of the blade comprises a combined thickness of the blunt and beveled surfaces, wherein the thickness of the blunt surface is at least about 50% of the overall thickness of the blade, and wherein the leading edge is rounded across a width of the blade from one side of the blade to the opposing side of the blade;
    a neck coupled to the blade; and
    a handle coupled to the neck.

2. The shovel of claim 1, wherein the thickness of the blunt surface is about 50% of the overall thickness of the blade.

3. The shovel of claim 1, wherein the blade comprises a width, and wherein a ratio of the overall thickness of the blade to the width is between about 0.010 and about 0.050.

4. The shovel of claim 3, wherein the ratio of the overall thickness of the blade to the width is about 0.028.

5. The shovel of claim 1, wherein the blade comprises a length, and wherein a ratio of the overall thickness of the blade to the length is between about 0.010 and about 0.050.

6. The shovel of claim 5, wherein the ratio of the overall thickness of the blade to the length is about 0.025.

7. The shovel of claim 1, wherein the beveled surface forms an angle of between about 10° and about 50° relative to the blunt surface.

8. The shovel of claim 7, wherein the beveled surface forms an angle of about 30° relative to the blunt surface.

9. The shovel of claim 1, wherein the beveled surface forms an angle of between about 40° and about 80° relative to the bottom surface.

10. The shovel of claim 9, wherein the beveled surface forms an angle of about 60° relative to the bottom surface.

11. The shovel of claim 1, wherein the neck is removably coupled to the blade, and the handle is removably coupled to the neck.

12. The shovel of claim 1, wherein the neck forms a one-piece monolithic construction with the blade.

13. The shovel of claim 1, wherein the leading edge is configured to prevent puncturing of utility lines located within the utility location.

14. The shovel of claim 1, wherein the overall thickness is about 0.250 inches.

15. The shovel of claim 1, wherein the non-metal material comprises a high-strength polymer.

16. The shovel of claim 1, wherein the leading edge defines a generally non-pointed, rounded edge.

17. The shovel of claim 1, wherein the blunt surface is substantially flat and extends perpendicularly away from the top surface.

18. A non-metal shovel blade, comprising:
    first and second opposing side edges;
    a convex bottom surface extending between the first and second opposing side edges;
    a concave top surface extending between the first and second opposing side edges; and
    a leading edge extending lengthwise along an arcuate path between the first and second opposing side edges, and extending between the bottom and top surfaces, the leading edge comprising a flat blunt surface extending perpendicularly relative to the top surface and a flat beveled surface extending from the flat blunt surface to the bottom surface at an angle between about 40° and about 80° relative to the top surface, and wherein the leading edge is rounded from the first side edge to the opposing second side edge;
    wherein a thickness of the flat blunt surface is at least about 50% of a total thickness of the blade and a thickness of the flat beveled surface is at most about 50% of the total thickness of the blade.

19. A non-metal shovel blade, comprising:
    a blunt surface portion of a leading edge; and
    a beveled surface portion of the leading edge;
    wherein an overall thickness of the blade comprises a combined thickness of the blunt and beveled surface portions, wherein the thickness of the blunt surface is at least about 50% of the overall thickness of the blade, and wherein the leading edge is substantially rounded in a convex shape from a side of the blade to an opposing side of the blade.

* * * * *